Figure 1:
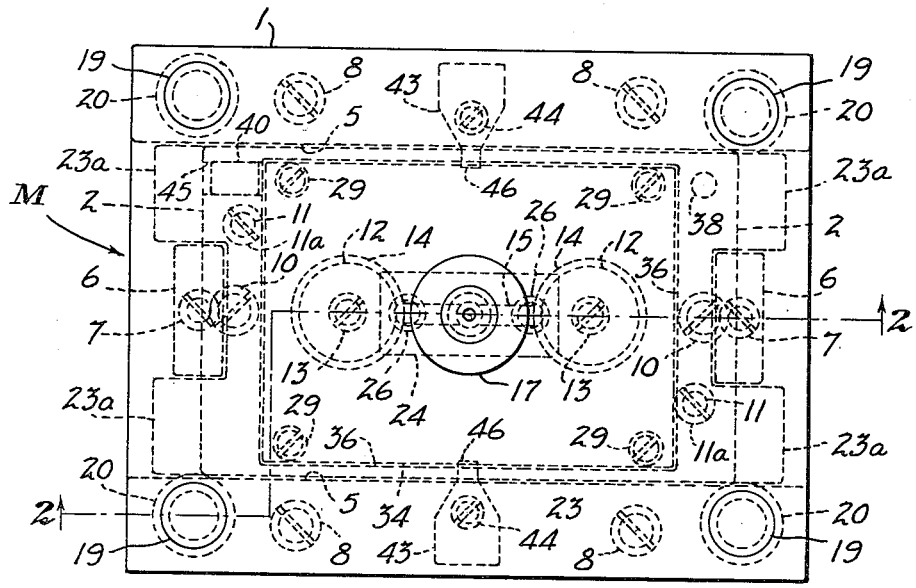

July 17, 1962 A. E. WISKOFF ETAL 3,044,121
MOLDING ASSEMBLY
Filed Jan. 12, 1960 2 Sheets-Sheet 1

INVENTORS
*Arthur E. Wiskoff*
*Julius P. Szorady*
BY
*McCoy, Greene & Te Grotenhuis*
ATTORNEYS July 17, 1962     A. E. WISKOFF ETAL     3,044,121
MOLDING ASSEMBLY
Filed Jan. 12, 1960     2 Sheets-Sheet 2
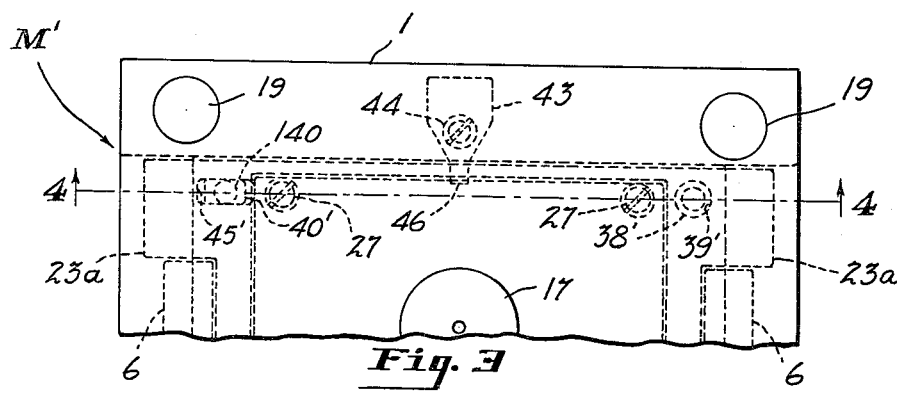
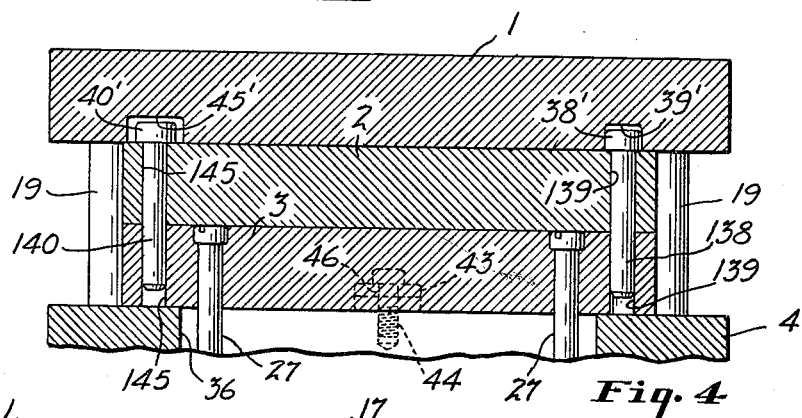
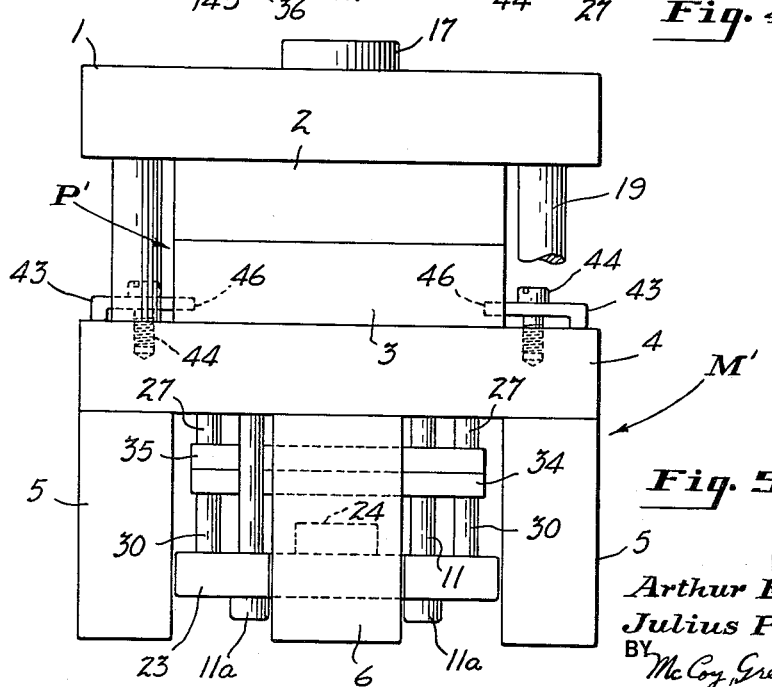
INVENTORS
*Arthur E. Wiskoff*
*Julius P. Szorady*
BY
*McCoy, Greene & TeGrotenhuis*
ATTORNEYS

United States Patent Office 3,044,121
Patented July 17, 1962

3,044,121
MOLDING ASSEMBLY
Arthur E. Wiskoff, 9501 Park Heights Ave., Garfield Heights, Ohio, and Julius P. Szorady, 4419 Greenway Ave., South Euclid, Ohio
Filed Jan. 12, 1960, Ser. No. 1,913
9 Claims. (Cl. 18—42)

The present invention relates to an improved mold base and more particularly to a master mold base constructed to receive a replaceable cavity-and-ejector-plate unit.

For many years prior to this invention the manufacture of numerous plastic parts of different sizes has required an extremely large investment in mold bases. The labor cost in changing mold bases was also very high. It was not known how the accuracy needed for high pressure plastic molding could be obtained in a more economical manner.

The mold base of the present invention provides the accurate alignment between the two cavity plates without the necessity for time-consuming adjustments and without the need for expensive aligning means in the cavity plates. The cavity plates are radically different from those previously employed since they are relatively small and do not receive the conventional leader pins. The accurate alignment between the anchor plate and the back-up plate of a master mold base is obtained by leader pins which are outside the cavity plate, and novel means are provided to accurately locate the cavity plates relative to the anchor plate and the back-up plate. Such means preferably comprises a dowel pin for locating one end of each cavity plate and an elongated key or the like for determining the angular position of the cavity plate, which key will function properly in spite of longitudinal expansion or contraction of the cavity plate due to heat treatment. Similar means is preferably provided for each cavity plate in addition to bolts for rigidly attaching the cavity plates to the master mold base.

The lower cavity plate is provided with ejector pins and return pins which are rigidly attached to a relatively small ejector plate, the return pins preferably having enlarged heads to prevent the ejector plate from falling away from the cavity plate when the cavity plate is removed from the master mold base. These elements constitute an inexpensive replaceable unit which, together with the upper cavity plate, can be removed from the master mold base and replaced with similar elements having different size mold cavities to permit manufacture of different plastic parts. The back-up plate is unusual in that it has a central opening therein of a size at least slightly greater than that of the ejector plate to permit removal of the ejector plate through the back-up plate when the replaceable unit is lifted vertically out of the bottom portion of the master mold base.

The master mold base is preferably provided with a sub-ejector plate below the replaceable unit, which is considerably larger than the ejector plate of such replaceable unit, so that the mold base will function properly with various conventional molding machines many of which have the knock-out bars located in such a manner that they would not actuate the relatively small ejector plate if the sub-ejector plate were omitted. The mold base of the present invention is, therefore, suitable for use on most conventional plastic molding machines.

The object of the present invention is to provide inexpensive equipment for manufacturing a large number of plastic articles of different sizes and shapes.

Another object of the present invention is to reduce the time required for changing from one size mold cavity to another in a molding machine.

A still further object of the present invention is to provide inexpensive cavity plates which can be accurately mounted both before and after heat treatment and which do not require hardened die inserts.

Another object of the present invention is to provide an inexpensive mold base having replaceable cavity plates which can be removed and replaced quickly and aligned to very close tolerances by one person in an extremely short period of time, without the necessity for aligning or relocating return pins or ejector pins.

A further object of the present invention is to provide an inexpensive mold base which may be used on conventional molding machines and which has compact inexpensive replaceable elements permitting manufacture of a large number of different size articles with a minimum investment in equipment.

Figure 2:
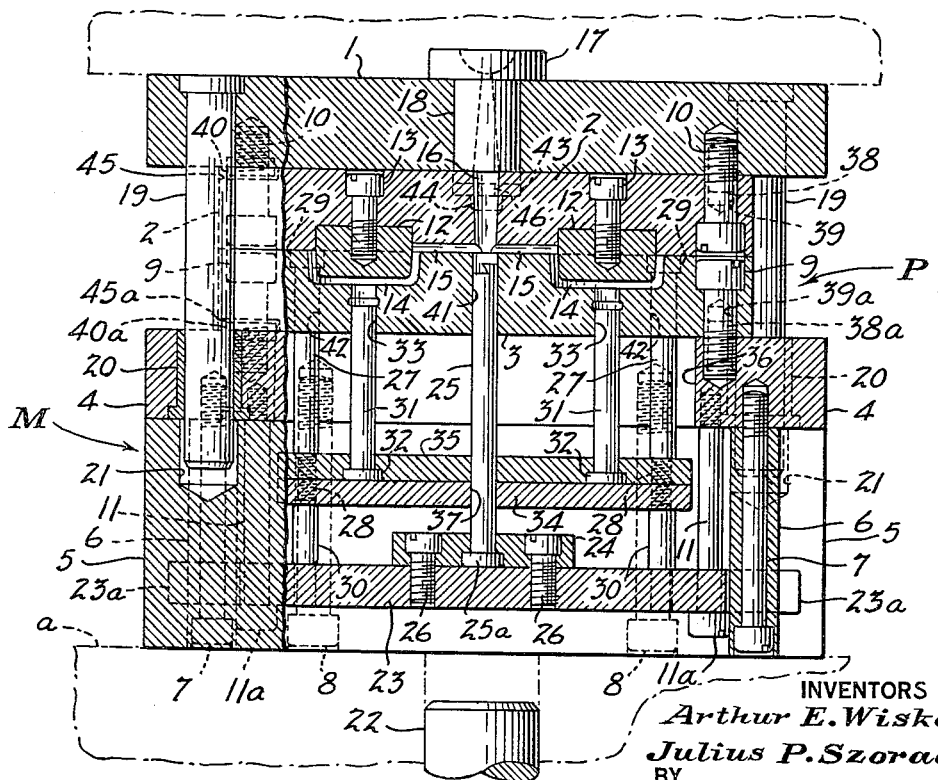

Other objects, uses and advantages of the present invention will become apparent to those skilled in the art from the following description and claims and from the drawings, in which: FIGURE 1 is a top plan view on a reduced scale showing a mold base constructed according to the present invention; FIGURE 2 is a vertical sectional view with parts broken away taken substantially on the line indicated at 2—2 in FIG. 1, the parts of the molding machine attached to the top and bottom of the mold base being shown in dot-dash lines; FIGURE 3 is a fragmentary top plan view similar to FIG. 1 and on the same scale showing a modified form of mold base; FIGURE 4 is a vertical sectional view taken substantially on the line indicated at 4—4 in FIG. 3; and FIGURE 5 is an end view of the modified mold base on the same scale as FIGS. 1 to 4.

Referring more particularly to the drawings, which are drawn to scale and in which like parts are identified by the same numerals in both views, 1 is an anchor plate rigidly mounted on the flat surface *a* of a conventional molding machine, 2 is an upper mold plate, 3 is a lower mold plate, and 4 is a hollow back-up plate, said plates being flat horizontal members of rectangular shape. A pair of large parallel rectangular side members 5 are rigidly mounted on the flat surface *a* of the machine shown in dot-dash lines.

A pair of smaller rectangular bridge members 6 extend from the surface *a* to the back-up plate 4 and are rigidly connected to said plate by bolts 7. The bridge members provide posts or pillars to support the back-up plate midway between the side members 5, which are also rigidly connected to the back-up plate by four bolts 8.

The mold plates 2 and 3 are detachably connected to the plates 4 and 1, respectively, by the bolts 9 and 10 and have cavities therein to receive the cores 12 which are rigidly connected to the plate 2 by bolts 13. The cores are spaced from the back-up plate to provide conventional mold cavities 14 which communicate by means of radial passages 15 with a central passage 16. A sprue member 17 is mounted in the plate 1 and has a nozzle 18 coaxial with the passage 16.

Externally cylindrical vertical leader pins 19 are rigidly mounted in the four corner portions of the plate 1. Four internally cylindrical flanged metal bushings 20 are rigidly clamped in position on the back-up plate 4 to receive the pins 19, and four bores 21 are provided in the upper corner portions of the members 5 to receive the lower end portions of the leader pins. The bushing 20 has a uniform internal diameter corresponding to the uniform external diameter of the leader pins 19 whereby the plates 1 and 4 are accurately located relative to each other.

A generally rectangular sub-ejector plate 23 is provided below the plate 4 and is mounted for vertical movement. This plate has four corner portions 23a which slidably engage the bridge members 6 and project longitudinally past said members. A plurality of vertical guide bolts 11 may be provided on the plate 4 to guide the sub-ejector plate vertically. The plate 23 has a uniform width corresponding substantially to the distance between the side members 5 and is free to move vertically. If desired, the bolts 11 may be provided with enlarged heads 11a to limit the downward movement of the plate 23. The plate 23 is shown in its lowermost horizontal position in FIG. 2 when the mold is closed. A small clamping plate 24 is provided for holding the vertical sprue puller 25 and has a counterbore for receiving the head 25a of said sprue puller. Screws 26 are employed for attaching the clamping plate to the sub-ejector plate.

A conventional cylindrical knock-out bar 22 is provided for engaging the bottom of the plate 23 to cause relative vertical movement of said plate and the back-up plate 4 when the mold is opened. The mold shown herein is opened by retracting the plates 3 and 4 away from the plate 1, and the bar 22 is, therefore, stationary.

The mold base of the present invention is constructed for use with molding machines having conventional knock-out bars which are located at various locations on different machines. It is for this reason that the sub-ejector plate 23 is employed below the ejector plate 34. It will be apparent that the sub-ejector plate is not essential if the molding machine is constructed especially for cooperation with the particular mold base and has a knock-out bar adapted to engage the relatively small ejector plate 34 to impart the proper movement relative to the lower cavity plate 3. The mold base shown herein is preferred because it can be used on existing molding machines.

The lower mold plate 3 is constructed so that it may be readily removed and replaced, and this plate makes up the largest element of a replaceable cavity-and-ejector-plate assembly P. The plate is machined to receive four push-pack pins or return pins 27 and a pair of vertical ejector pins 31. Each push-back pin 27 preferably has an enlarged cylindrical head 29 which fits in a counterbore in the plate 3 and has a reduced threaded end portion 28 at its opposite end. Four short vertical cylindrical stop pins 30 are rigidly mounted on the sub-ejector plate 23 in positions coaxial with the push-back pins 27. These stop pins are provided to engage the flat horizontal bottom surface of a rectangular ejector plate 34. A rectangular clamping plate 35 of the same size is mounted on the ejector plate and has openings therein to receive the threaded end portions 28 which screw into the clamping plate. The clamping plate also has counterbores to receive the enlarged heads 32 at the bottom of the ejector pins 31 so that the ejector pins are rigidly clamped in position when the push-back pins are screwed into the ejector plate 34 as shown in FIG. 2.

The elements 3 and 27 to 35 make up the replaceable assembly P which can be readily removed merely by opening the mold, removing two bolts 9 and lifting the assembly off of the vertical cylindrical pin 25. The plates 34 and 35 have a vertical cylindrical bore 37 with an internal diameter corresponding to the external diameter of the pin 25, and the plate 3 has a bore 41 of the same diameter, whereby the assembly P is guided vertically on the pin 25 and can readily be mounted on or removed from such pin. The lower mold plate 3 has two vertical bores 33 at the bottoms of the mold cavities 14 with the same internal diameter as the external diameter of the ejector pins so as to assist in locating the ejector plate and guiding it vertically while holding it in a horizontal position. The plate 3 also has 4 vertical cylindrical bores 42 of the same diameter as the pins 27 to guide such pins vertically while holding them in vertical positions. The pins 27 and 31 therefore provide means for accurately holding the ejector plate 34 in its horizontal position while guiding it vertically. The heads 29 of the push-back pins are not essential for proper functioning of the mold, but they prevent the ejector plate from falling off when the lower mold plate 3 is removed and make it much easier to assemble and disassemble the machine. Such heads also insure that the ejector plate is maintained in the same angular position relative to the plate 3.

The central portion of the back-up plate 4 is cut away to provide a rectangular opening having vertical walls 36 which permit movement of the plates 34 and 35 through the back-up plate, such rectangular opening having dimensions only slightly greater than those of the plates 34 and 35 as shown in FIGS. 1 and 2. It will be noted that the width of the ejector plate is less than the distance between the side members 5 so that the ejector plate, like the sub-ejector plate, is free to move vertically relative to the back-up plate from the lowermost position shown in FIG. 2.

Because of the necessity for very high accuracy, the assembly P and the mold plates 2 and 3 should be placed in the same position whenever such assembly, or a replacement therefor, is placed in the machine. It is, therefore, necessary to locate the upper and lower mold plates 2 and 3 accurately (i.e., within 0.0005 inch) relative to the permanent plates 1 and 4, respectively. The bolts 9 and 10 cannot be relied upon to provide this accuracy. According to the present invention, a dowel pin 38 is rigidly mounted on the anchor plate 1 and projects a short distance below the flat, horizontal bottom surface thereof as indicated in FIG. 2. A vertical cylindrical bore 39 is provided in the upper portion of the mold plate 2 to receive the dowel pin, said bore having a diameter corresponding to that of the pin so as to locate the upper mold plate accurately relative to the anchor plate. In order to prevent angular movement between these plates, it is necessary to provide another locating means. Such means is preferably a rectangular metal key 40 rigidly mounted in the anchor plate 4 and projecting below the flat horizontal bottom surface of the plate as indicated in FIG. 2. The mold plate 2 has a rectangular slot 45 in the upper portion thereof with the same width as the key 40 to receive such key. The key and the slot are elongated in the direction of the dowel pin 38 as shown in FIGS. 1 and 2 so that it is easy to move the key into the slot as the mold plate 2 is placed on the dowel pin. The slot 45 has a length greater than that of the key so that the assembly is very easy.

The back-up plate 4 is provided with a dowel pin 38a and a rectangular key 40a of the same size as the dowel 38 and the key 40, respectively and in vertical alignment with these elements. The dowel 38a and the key 40a are rigidly mounted on the back-up plate and project above the flat horizontal upper surface of said plate the same distance as the pin 38 and the key 40 project below the anchor plate 1. As shown in FIG. 2, the lower mold plate 3 has a bore 39a and a slot 45a vertically aligned with and of the same size as the bore 39 and the slot 45 respectively of the upper mold plate 2. The dowel pin and key of the back-up, therefore, function the same as the corresponding elements of the anchor plate to provide accurate positioning of the lower mold plate 3.

When it is desired to replace both the upper and lower mold plates as, for example, when preparing to mold a different size article, the upper mold plate 2 may be readily removed by unscrewing the bolts 10. If desired, set-up clamps 43 may be provided having projecting end portions 46 extending into the sides of the plate 2 to hold the plate 2 temporarily in position against the plate 1 while the bolts 10 are removed. Such set-up clamps reduce the time needed for replacing the upper mold plate 2. It will be apparent, however, that the set-up clamps may be omitted and that they may be removed at any time by unscrewing the screws 43 holding them in position.

Heretofore, the plates forming the mold cavities in a mold base have been constructed to receive the leader pins so as to provide the accurate alignment necessary. In the present invention the cavity plates 2 and 3 and the other parts of the unit P are replaceable and the rest of the mold base comprises a master mold base which can receive other replaceable units having mold cavities of different sizes. The leader pins are provided only in the master mold base. This results in a great saving not only because of the great reduction in cost of the replaceable units P but also because of the great savings in the time needed to replace such units.

The provision of locating projections on the anchor plate and on the back-up plate which are able to provide accurate positioning of the cavity plates 2 and 3 relative to the permanent plates 1 and 4 makes it unnecessary to employ the leader pins 20 as means for aligning the cavity plates. The use of the leader pins to align only the parts 1 and 4 is practical because of the fact that it is easy to mount the cavity plates on such specially designed projections and because high accuracy of positioning is obtained in spite of such ease of assembly. The novel construction resulting from the present invention makes possible tremendous savings when it is necessary to mold a large number of plastic parts of different shapes or sizes.

If, for example, a plastic piece required a conventional mold base costing about 250 dollars, the equipment needed for making eight pieces of this type in different sizes would be in the neighborhood of 2,000 dollars. It would not be practical to replace the cavity plates in such a conventional mold base even if the plates themselves cost less than 100 dollars because the additional expense including the cost of providing the accurate alignment of parts, etc. would probably approach the cost of a new mold base. It was for this reason that, heretofore, manufacturers usually stored the complete mold bases on the shelf for possible future use rather than attempting to modify the cavity plates.

The cost of making a large number of different size pieces using the apparatus of the present invention is considerably less. It would be possible, for example, to make a master mold base for less than 400 dollars and to make each replaceable unit P for less than 75 dollars. All that would be necessary to make a part of a different size would be another replaceable unit P including the cavity plate 2. If this replaceable equipment costs less than 75 dollars the total investment in equipment necessary to make different size plastic pieces using eight different replaceable units, would be less than 1,000 dollars or less than half the cost of separate mold bases as indicated above.

There are additional savings in labor. Since the replaceable unit is relatively small, it usually can be removed and replaced by one man, rather than two, and without the assistance of a hoist. It requires about 3½ to 4 hours to replace an ordinary mold base having the conventional water passages. The time required to remove a replaceable unit from a master mold base constructed according to the present invention and to replace it with another unit with a different size mold cavity is less than ⅕ the above-mentioned time and is usually only ¼ to ½ hour.

The provision of an ejector plate in the removable assembly P effects great savings of time since it is unnecessary to relocate the ejector pins for different mold cavities. The replaceable unit has the advantage that it does not need to be carefully reset to obtain the necessary accuracy. In conventional mold bases the resetting of the machine has taken an extremely large amount of time.

The operation of the mold base of this invention will readily be apparent from the drawings. When the mold is closed as shown in FIGS. 1 and 2, the plastic is forced through the nozzle 18 into the mold cavities to effect molding in the conventional manner. The removable part of the machine indicated at $a$ is then moved downwardly away from the anchor plate 1 carrying with it the members 3, 4 and 5 which are rigidly attached thereto. As the parts move downwardly the sub-ejector plate 23 engages the stationary knock-out bar 22 so that the ejector plates 23 and 34 stop moving. As the lower cavity plate 3 continues to move downwardly the plastic part is ejected from the mold cavity by the ejector pins 31. Thereafter the parts 3, 4 and 5 are moved upwardly toward a closed position. The return pins 27 first engage the upper cavity plate 2 to stop the movement of the ejector plate 34. The stop pins 30 then engage the ejector plate to stop upward movement of the sub-ejector plate 23. As a result, the lower cavity plate 3 slides over the pins 25, 27 and 31 as it moves against the upper cavity plate as shown in FIG. 2.

When it is desired to replace the unit P and substitute another unit having a different size or shape or mold cavity, the mold is opened, the bolts 9 are removed, and the unit P is lifted out of the mold base. If there are water passages, these are disconnected beforehand. After the unit has been removed, the bolts 10 may be unscrewed to permit removal of the upper mold plate 2. It is relatively easy to replace the cavity plate 2 with another cavity plate and to insert another unit P into the mold base. When the upper cavity plate 2 is inserted, the opening 39 thereof is placed directly below the dowel pin 38 and the opening 45 is placed directly below the key 40. The pin and key accurately locate the upper cavity plate on the machine when the bolts 10 are tightened without the necessity for any fine adjustment.

When the unit P is replaced, the bore 37 is placed directly above the sprue puller 25 and the ejector plate 34 is slid over the member 25 through the central opening of the back-up plate 4. The dowel pin 38$a$ and the key 40$a$ readily enter the associated openings 39$a$ and 45$a$ respectively of the lower cavity plate 3 as the cavity plate is dropped on the back-up plate. The cavity plate 3 is, therefore, accurately aligned with the upper cavity plate 2 when the bolts 9 are tightened.

Since the keys 40 and 40$a$ do not interfere with expansion and contraction of the cavity plates 2 and 3 it is possible to obtain proper alignment of the cavity plates either before or after heat treating of such plates. It is possible to cut the mold cavities in the mold plates 2 and 3 and thereafter to harden the plates by heat treatment. This saves money by eliminating pocket work and die inserts. The replaceable unit of the present invention is, therefore, ideal for low cost tooling on short run or sample shots. The replaceable unit is also highly suitable for long run jobs. The locating members 38, 38$a$, 40 and 40$a$ will provide the necessary accuracy of alignment in spite of growth or shrinkage of the cavity plates. Such change in the dimensions of the cavity plates do not make assembly more difficult.

FIGS. 3, 4 and 5 show a mold base which is exactly the same as the mold base shown in FIGS. 1 and 2 except that different means are provided for locating the cavity plates 2 and 3 relative to the plates 1 and 4 of the master mold base M and the set-up clamps 43 are located on the top of the back-up plate 4 instead of on the bottom of the anchor plate 1. Instead of locating the lower cavity plate 3 relative to the back-up plate 4 by means of the dowel 38$a$ and the key 40$a$, the plate 3 is located relative to the upper cavity plate 2 by means of cylindrical pins 138 and 140.

As best shown in FIGS. 3 and 4, the pin 138 fits in the aligned bores 139 of the cavity plates 2 and 3 so as to locate the two cavity plates relative to each other. A similar pin 140 fits in the aligned cylindrical bores 145 of the plates 2 and 3 and functions in the same manner whereby the plates 2 and 3 are accurately aligned when the mold is closed and the pins 138 and 140 are located within the bores 139 and 145 respectively of the lower cavity plate 3. For simplicity, the means for locating the upper cavity plate 2 with respect to the anchor plate 1 is preferably integral with the pins 138 and 140. Such means preferably functions generally like the dowel 38 and the key 40. As herein shown, the pin 138 has an enlarged cylindrical head 38′ which fits in a circular hole 39' of the same diameter in the anchor plate 1, and the pin 140 has an enlarged non-circular head 40' which fits in a suitable slot 45' in the plate 1 as shown in FIG. 4. The head 40 preferably has two flat parallel sides engaging two flat parallel sides of the slot 45' so as to function like the key 40 and its associated slot 45. The head 40' may be rectangular but is preferably formed by flattening two sides of a circular head similar to the head 38'.

It will be apparent from the drawings that the removable cavity-and-ejector plate assembly P' and the remaining parts forming the master mold base M' are the same as the assembly P and the master mold base M previously described except for the pins 138 and 140 and the associated elements and except for the location of the set-up clamps 43. It will be noted that the clamps 43 are mounted on the hollow back-up plate 4 by means of the screws 44 and that the projecting end portions 46 thereof project into the lower cavity plate 3 to permit clamping of said cavity plate to the back-up plate when the screws 44 are tightened.

The assembly P' is readily mounted on the master mold base M'. The pins 138 and 140 are first dropped into the bores 139 and 145 respectively of the upper cavity plate 2. The heads 38' and 40' are then inserted into the cavities 39' and 40' respectively before the bolts 10 are tightened. This locates the upper cavity plate 2 on the anchor plate 1 and rigidly connects the plates. If desired, set-up clamps 43 may be provided on the under side of the anchor plate 1 as shown in FIGS. 1 and 2 to help hold the upper cavity plate in position before the bolts 10 are tightened but this is unnecessary and such additional clamps 43 are omitted in FIGS. 3 to 5.

While the mold is open, the remaining parts of the assembly P' are inserted into the master mold base M' until the upper cavity plate 3 rests on the anchor plate 4. The plate 3 is manually positioned so as to permit entry of the pins 138 and 140 into the bores 139 and 145. The mold is then closed completely without inserting the bolts 9. The closing of the mold accurately aligns the cavity plates 2 and 3 as shown in FIG. 4. While the mold is closed the set-up clamps are positioned as shown in FIGS. 4 and 5 and the screws 44 are tightened to clamp the cavity plate 3 in position. The mold is then opened, the bolts are inserted and said bolts are tightened to permanently locate the cavity plate 3 relative to the back-up plate 4. The mold base is then ready for molding and will function exactly the same as the mold base of FIGS. 1 and 2.

The pins 138 and 140 simplify the manufacture since it is very easy to drill the holes 139 and 145. The locating means of FIGS. 3 and 4 is usually less expensive than the locating means employed in the mold base of FIGS. 1 and 2 since only two holes 39' and 45' must be provided in the permanent assembly M' of the mold base and since the only machining required for the cavity plates involves the easily formed cylindrical bores. The machining of slots in the two cavity plates to receive the keys 40 and 40a is, therefore, avoided.

It will be apparent to those skilled in the art that all of the parts of the mold base shown herein may be made of high quality steel and that all plates may be surface ground so as to be flat, parallel and square on all faces. The mold base of this invention is relatively inexpensive even when manufactured to close tolerances using high carbon or mild pre-hardened, annealed tool steel.

It will be understood that the above description is by way of illustration rather than limitation and that, in accordance with the provisions of the patent laws, variations and modifications of the specific device shown herein may be made without departing from the spirit of the invention.

Having described our invention, we claim:

1. In combination, a mold base having an anchor plate, a series of leader pins mounted on the anchor plate and perpendicular thereto, a back-up plate parallel to said anchor plate and having bushings slidably receiving said leader pins, said anchor plate and said back-up plate being mounted for relative opening and closing movement toward and away from each other, first and second removable mold plates mounted in parallel aligned positions between said anchor plate and said back-up plate, removable means for rigidly connecting said first mold plate to said anchor plate, removable means for rigidly connecting said second mold plate to said back-up plate, detachable means for accurately locating said first mold plate relative to said anchor plate, detachable means for accurately locating said second mold plate relative to said back-up plate in alignment with said first mold plate, means forming a central opening in said back-up plate, an ejector plate parallel to said second mold plate and adapted to move relative to said back-up plate through said opening to an ejecting position adjacent said second mold plate, an ejector pin carried by said ejector plate and slideably mounted in said second mold plate, a plurality of return pins carried by said ejector plate and slidably mounted in said second mold plate, said return pins projecting a substantial distance above said second mold plate when the ejector plate is in said ejecting position, said first mold plate engaging the return pins to retract the ejector plate when the mold is closed, said second mold plate, said ejector plate, said ejector pin and said return pins comprising a removable assembly, said leader pins being spaced apart and located around said mold plates to permit removal of said removable assembly and said first mold plate when the mold is open.

2. A combination as defined in claim 1 wherein the means for locating the first mold plate relative to the anchor plate comprises a single dowel pin extending between said plates near one end of the first mold plate and a single key at the opposite end of said mold plate extending into both of said plates, said key preventing movement in directions perpendicular to the line joining the centers of said key and said dowel pin without preventing slight movement in the direction of said line so as to allow for expansion or contraction of parts.

3. A master mold base for receiving a replaceable cavity-and-ejector-plate assembly which comprises first and second removable mold plates mounted in parallel aligned positions and having recesses therein defining a mold cavity, an ejector plate parallel to said second mold plate, an ejector pin carried by said ejector plate for extending through said second mold plate into said mold cavity, and a plurality of return pins carried by said ejector plate and slidably mounted in said second mold plate; said mold base having an anchor plate with means for accurately locating and rigidly holding said first mold plate, a series of leader pins mounted on the anchor plate and perpendicular thereto, a back-up plate having an outer surface parallel to said anchor plate for engaging said second mold plate and having bushings slidably receiving said leader pins, said back-up plate having a central opening of a size to permit movement of said ejector plate into and out of said opening in a direction perpendicular to said anchor plate and having means outwardly of said central opening for rigidly holding said second mold plate to maintain it accurately in a predetermined position relative to said first mold plate, side members rigidly connected to said back-up plate on the side thereof remote from said anchor plate, a sub-ejector plate between said side members parallel to said anchor plate and extending across said central opening, said sub-ejector plate having means for engaging said ejector plate when the sub-ejector plate is moved toward said anchor plate, and means for guiding the sub-ejector plate toward and away from said anchor plate.

4. A mold base as defined in claim 3 wherein said sub-ejector plate carries a sprue-pulling pin for extending through said ejector plate and said second mold plate.

5. A replaceable cavity-and-ejector-plate assembly for a master mold base having an anchor plate, no more than four leader pins mounted on the marginal portions of the anchor plate and perpendicular thereto, a back-up plate parallel to said anchor plate having guide means for slidably receiving said leader pins and having a central rectangular opening, and a sub-ejector plate extending across said central opening and mounted for movement toward and away from said back-up plate; said assembly comprising first and second removable rectangular mold plates having recesses therein forming a plurality of mold cavities between said plates, said second mold plate having a plurality of bores, a rectangular ejector plate parallel to and spaced from said mold plates for engaging portions of said sub-ejector plate, a plurality of return pins mounted on the marginal portions of said ejector plate perpendicular to said plates and extending through the bores of said second mold plate, each return pin having an enlarged head to prevent separation of said ejector plate and said second mold plate, and a plurality of ejector pins parallel to said return pins and movable through the bores of said second mold plate to said mold cavities, said return pins projecting a substantial distance beyond said second mold plate when the ejector plate is in an ejecting position, said first mold plate engaging the return pins to retract the ejector plate and thereby move the ejector pins out of the mold cavities when the mold is closed, said mold plates having bolt-receiving openings for connecting the first mold plate to the anchor plate and the second mold plate to the back-up plate, said mold plates being of a size to fit between and out of contact with said leader pins and said ejector plate being of a size to move into and out of said central opening in a direction perpendicular to said anchor plate so that the assembly may readily be moved bodily into or out of the master mold base with the ejector pins and return pins in place in said assembly.

6. An assembly as defined in claim 5 wherein said second mold plate and said ejector plate have axially aligned central bores spaced from the mold cavities and located to receive a sprue-pulling pin carried by said sub-ejector plate, and wherein said mold plates have recesses therein defining passages leading radially outwardly from the central bore of said second mold plate to said mold cavities.

7. An assembly as defined in claim 5 wherein said first and second mold plates have two pairs of axially aligned bores with a diameter less than that of said leader pins located radially outwardly of said ejector plate for receiving locating pins.

8. In combination, a mold base having an anchor plate; no more than four of leader pins mounted on the anchor plate and perpendicular thereto; a back-up plate parallel to said anchor plate and having bushings slidably receiving said leader pins, said back-up plate having a central opening, said anchor plate and said back-up plate being mounted for relative opening and closing movement toward and away from each other; first and second removable mold plates mounted in parallel aligned positions between said anchor plate and said back-up plate radially inwardly of said leader pins and having at least one recess defining a mold cavity between said mold plates; removable bolts for rigidly connecting said first mold plate to said anchor plate; removable bolts outwardly of said central opening for rigidly connecting said second mold plate to said back-up plate; detachable means for accurately locating said first mold plate relative to said second mold plate comprising a pair of bores extending through the first mold plate near opposite ends thereof, a pair of spaced bores of the same diameter extending through the second mold plate and coaxial with the bores of the first mold plate, a pair of locating pins of a size to fit in said bores extending through the bores of the first mold plate and projecting into the bores of the second mold plate; detachable means for accurately locating said first mold plate relative to said anchor plate comprising a head on one locating pin engaging said first mold plate, an opening of a size to receive said head in the face of said anchor plate nearest said first mold plate for holding the first mold plate against transverse movement in any direction relative to said anchor plate, a head on the other locating pin for engaging said first mold plate, and a slot in said anchor plate of the same width as said last-named head for receiving said head and preventing movement in directions transverse to the line joining the centers of said heads while allowing for expansion and contraction of the parts in the direction of said line; and means for ejecting each molded part from its mold cavity comprising a flat rectangular plate parallel to said mold plates and having pins mounted thereon near the four corners of said rectangular plate perpendicular to said plate and projecting into said central opening.

9. A master mold base as defined in claim 3, wherein said back-up plate has internally-threaded bolt-receiving openings outwardly of said central opening for receiving bolts to hold the second mold plate rigidly in position, said bolts being inaccessible when the mold is fully closed, and wherein clamping means are mounted on the exterior of said back-up plate at both sides thereof and are accessible from outside the mold base when the mold is fully closed, said clamping means being constructed to clamp the second mold plate in position on the back-up plate and to hold it in such position as the mold is moved from a fully closed to a fully open position whereby said bolts may be tightened to accurately position said second mold plate in the position it had when the mold was previously closed.

References Cited in the file of this patent

UNITED STATES PATENTS

| | | |
|---|---|---|
| 2,302,367 | Ericson | Nov. 17, 1942 |
| 2,327,665 | Peat | Aug. 24, 1943 |
| 2,479,350 | Haggard | Aug. 16, 1949 |
| 2,485,283 | Guelph | Oct. 18, 1949 |
| 2,574,223 | Nichols | Nov. 6, 1951 |
| 2,704,861 | Zumeta | Mar. 29, 1955 |
| 2,874,409 | Quarnstrom | Feb. 24, 1959 |
| 2,956,321 | Halword | Oct. 18, 1960 |